(12) United States Patent
Scott

(10) Patent No.: US 10,984,382 B2
(45) Date of Patent: *Apr. 20, 2021

(54) USER INTERFACE FOR INTEGRATING APPLICATIONS ON A MOBILE COMMUNICATION DEVICE

(71) Applicant: BlackBerry Limited, Waterloo (CA)

(72) Inventor: Sherryl Lee Lorraine Scott, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,375

(22) Filed: Oct. 11, 2019

(65) Prior Publication Data

US 2020/0042943 A1 Feb. 6, 2020

Related U.S. Application Data

(63) Continuation of application No. 14/199,717, filed on Mar. 6, 2014, now Pat. No. 10,469,414, which is a
(Continued)

(51) Int. Cl.
*G06Q 10/10* (2012.01)
*G06Q 30/02* (2012.01)
(Continued)

(52) U.S. Cl.
CPC ........... *G06Q 10/10* (2013.01); *G06F 3/0482* (2013.01); *G06Q 30/02* (2013.01); *H04L 51/04* (2013.01);
(Continued)

(58) Field of Classification Search
CPC ...... G06Q 10/10; G06Q 30/02; G06F 3/0482; H04M 1/72552; H04M 1/72566; H04M 2201/42; H04L 51/04
See application file for complete search history.

(56) References Cited

U.S. PATENT DOCUMENTS 5,375,200 A * 12/1994 Dugan .................. G06F 40/174
715/804
5,412,776 A 5/1995 Bloomfield et al.
(Continued)

FOREIGN PATENT DOCUMENTS

WO 9732439 A2 9/1997

OTHER PUBLICATIONS

Board of Appeal Decision issued on Nov. 21, 2018 for corresponding European Patent Application No. 10178511.1.
(Continued)

*Primary Examiner* — Daeho D Song
(74) *Attorney, Agent, or Firm* — Conley Rose, P.C.; J. Robert Brown, Jr.; Joseph J. Funston, III

(57) ABSTRACT

A user interface, in accordance with the teachings described herein, is provided for integrating applications on a mobile communication device. An instant messaging user interface may be included for displaying an instant messaging communication that includes an instant messaging contact. An instant messaging user interface menu may be included for displaying a list of commands, one or more of the commands being specific to the displayed instant messaging contact, and the list of commands including a command associated with a calendar application. The user interface may be operable to automatically launch the calendar application in response to a user selecting the command associated with the calendar application. A field in the calendar application may be automatically populated with the instant messaging contact.

17 Claims, 5 Drawing Sheets

Related U.S. Application Data continuation of application No. 12/772,853, filed on May 3, 2010, now Pat. No. 8,713,452, which is a continuation of application No. 10/982,293, filed on Nov. 5, 2004, now Pat. No. 8,856,663.

(60) Provisional application No. 60/567,563, filed on May 3, 2004.

(51) Int. Cl.

| | |
|---|---|
| *G06F 3/0482* | (2013.01) |
| *H04M 1/725* | (2006.01) |
| *H04L 12/58* | (2006.01) |
| *H04M 1/2745* | (2020.01) |
| *H04M 7/00* | (2006.01) |

(52) U.S. Cl.
CPC ...... *H04M 1/72552* (2013.01); *H04M 1/2745* (2013.01); *H04M 1/72566* (2013.01); *H04M 7/0024* (2013.01); *H04M 2201/42* (2013.01)

(56) References Cited

U.S. PATENT DOCUMENTS

| | | | |
|---|---|---|---|
| 5,463,727 A | 10/1995 | Wiggins et al. | |
| 5,548,745 A | 8/1996 | Egan et al. | |
| 5,708,825 A | 1/1998 | Sotomayor | |
| 5,874,954 A | 2/1999 | Kilmer et al. | |
| 5,933,142 A | 8/1999 | LaStrange et al. | |
| 5,999,938 A | 12/1999 | Bliss et al. | |
| 6,064,977 A * | 5/2000 | Haverstock | G06Q 10/109 |
| | | | 705/7.18 |
| 6,272,505 B1 | 8/2001 | De La Huerga | |
| 6,369,840 B1 * | 4/2002 | Barnett | G06Q 10/06314 |
| | | | 715/853 |
| 6,466,203 B2 | 10/2002 | Van EE | |
| 6,848,077 B1 | 1/2005 | McBrearty et al. | |
| 6,941,349 B2 * | 9/2005 | Godfrey | G06Q 10/107 |
| | | | 709/207 |
| 7,003,327 B1 | 2/2006 | Payne et al. | |
| 7,039,596 B1 * | 5/2006 | Lu | G06Q 10/1095 |
| | | | 705/7.13 |
| 7,047,483 B1 | 5/2006 | Acharya et al. | |
| 7,124,355 B1 | 10/2006 | Kukkal | |
| 7,185,285 B2 | 2/2007 | Van Dok et al. | |
| 7,200,638 B2 | 4/2007 | Lake | |
| 7,275,215 B2 | 9/2007 | Werndorfer et al. | |
| 7,333,976 B1 | 2/2008 | Auerbach et al. | |
| 7,373,142 B2 | 5/2008 | Scott | |
| 7,383,308 B1 | 6/2008 | Groves et al. | |
| 7,386,798 B1 | 6/2008 | Heikes et al. | |
| 7,426,537 B2 | 9/2008 | Lee et al. | |
| 7,441,194 B2 | 10/2008 | Vronay et al. | |
| 7,584,253 B2 | 9/2009 | Curbow et al. | |
| 7,590,696 B1 | 9/2009 | Odell et al. | |
| 7,669,134 B1 | 2/2010 | Christie et al. | |
| 7,752,270 B2 * | 7/2010 | Durand | G06Q 10/107 |
| | | | 709/206 |
| 7,870,199 B2 | 1/2011 | Galli et al. | |
| 7,991,636 B1 | 8/2011 | Groves | |
| 8,701,014 B1 | 4/2014 | Schlegel et al. | |
| 2002/0023230 A1 | 2/2002 | Bolnick et al. | |
| 2002/0054052 A1 | 5/2002 | Sharma et al. | |
| 2002/0097856 A1 | 7/2002 | Wullert, II | |
| 2002/0099777 A1 * | 7/2002 | Gupta | G06Q 10/107 |
| | | | 709/206 |
| 2002/0107930 A1 | 8/2002 | Itoh | |
| 2002/0128036 A1 | 9/2002 | Yach et al. | |
| 2002/0138582 A1 | 9/2002 | Chandra et al. | |
| 2002/0178231 A1 | 11/2002 | Matsa et al. | |
| 2003/0030670 A1 | 2/2003 | Duarte et al. | |
| 2003/0046296 A1 | 3/2003 | Doss et al. | |
| 2003/0097361 A1 * | 5/2003 | Huang | H04L 51/14 |
| 2003/0131023 A1 | 7/2003 | Bassett | |
| 2003/0156138 A1 | 8/2003 | Vronay et al. | |
| 2003/0222904 A1 | 12/2003 | Allor et al. | |
| 2004/0017396 A1 | 1/2004 | Werndorfer et al. | |
| 2004/0019912 A1 | 1/2004 | Staack | |
| 2004/0054646 A1 | 3/2004 | Daniell et al. | |
| 2004/0073643 A1 | 4/2004 | Hayes et al. | |
| 2004/0078441 A1 | 4/2004 | Malik et al. | |
| 2004/0107256 A1 * | 6/2004 | Odenwald | H04L 29/06 |
| | | | 709/205 |
| 2004/0172456 A1 | 9/2004 | Green et al. | |
| 2004/0174392 A1 * | 9/2004 | Bjoernsen | G06Q 10/10 |
| | | | 715/751 |
| 2004/0205475 A1 | 10/2004 | Colson et al. | |
| 2004/0243677 A1 | 12/2004 | Curbow et al. | |
| 2004/0268263 A1 | 12/2004 | Van Dok et al. | |
| 2004/0268265 A1 | 12/2004 | Berger et al. | |
| 2005/0086309 A1 | 4/2005 | Galli et al. | |
| 2005/0091095 A1 * | 4/2005 | Wilbrink | G06Q 10/06314 |
| | | | 705/7.19 |
| 2005/0114781 A1 | 5/2005 | Brownholtz et al. | |
| 2005/0114783 A1 | 5/2005 | Szeto | |
| 2005/0125737 A1 | 6/2005 | Allen et al. | |
| 2005/0149395 A1 | 7/2005 | Henkin et al. | |
| 2005/0149851 A1 | 7/2005 | Mittal | |
| 2005/0166154 A1 | 7/2005 | Wilson et al. | |
| 2005/0193345 A1 | 9/2005 | Klassen et al. | |
| 2005/0204309 A1 * | 9/2005 | Szeto | H04L 51/10 |
| | | | 715/811 |
| 2005/0216834 A1 * | 9/2005 | Gu | G06F 40/14 |
| | | | 715/248 |
| 2005/0246544 A1 | 11/2005 | Moore et al. | |
| 2005/0256925 A1 | 11/2005 | Luo et al. | |
| 2006/0129643 A1 | 6/2006 | Nielson et al. | |
| 2006/0212510 A1 | 9/2006 | Nielson | |

OTHER PUBLICATIONS

Summons to attend oral proceedings pursuant to Rule 115(1)EPC, EP No. 10178511.1 dated May 4, 2018.
Rogers, R. et al.; Novell GroupWise 6.5 Messaging Fundamentals; Nov. 21, 2003; retrieved online Mar. 8, 2005 from http://www.inforit.com/articles/article.asp?;=102026.
Pastore, E.; Search Report from corresponding European application No. 10178511.1; search completed Oct. 29, 2010.
Lefebvre, D.; Search Report from corresponding PCT Application No. PCT/CA2004/001923; search completed Feb. 25, 2005.
America Online, Inc.; "AIM Service Using Text Messaging (SMS)"; AOL Instant Messenger; 2002; 20 pages.
Office Action dated Jul. 3, 2007; U.S. Appl. No. 10/982,293, filed Nov. 5, 2004; 8 pages.
Final Office Action dated Dec. 31, 2007; U.S. Appl. No. 10/982,293, filed Nov. 5, 2004; 14 pages.
Office Action dated Apr. 24, 2008; U.S. Appl. No. 10/982,293, filed Nov. 5, 2004; 11 pages.
Final Office Action dated Sep. 3, 2008; U.S. Appl. No. 10/982,293, filed Nov. 5, 2004; 12 pages.
Office Action dated Dec. 23, 2008; U.S. Appl. No. 10/982,293, filed Nov. 5, 2004; 13 pages.
Final Office Action dated Jun. 12, 2009; U.S. Appl. No. 10/982,293, filed Nov. 5, 2004; 16 pages.
Office Action dated Nov. 30, 2009; U.S. Appl. No. 10/982,293, filed Nov. 5, 2004; 9 pages.
Advisory Action dated Mar. 18, 2010; U.S. Appl. No. 10/982,293, filed Nov. 5, 2004; 3 pages.
Final Office Action dated Jul. 22, 2010; U.S. Appl. No. 10/982,293, filed Nov. 5, 2004; 12 pages.
Decision on Appeal dated Mar. 26, 2014; U.S. Appl. No. 10/982,293, filed Nov. 5, 2004; 7 pages.
Notice of Allowance dated Jun. 11, 2014; U.S. Appl. No. 10/982,293, filed Nov. 5, 2004; 6 pages.
Office Action dated Nov. 14, 2012; U.S. Appl. No. 12/772,853, filed May 3, 2010; 13 pages.
Final Office Action dated Mar. 12, 2013; U.S. Appl. No. 12/772,853. filed May 3, 2010; 12 pages.

(56) References Cited

OTHER PUBLICATIONS

Office Action dated Jul. 15, 2013; U.S. Appl. No. 12/772,853, filed May 3, 2010; 11 pages.
Notice of Allowance dated Nov. 20, 2013; U.S. Appl. No. 12/772,853, filed May 3, 2010; 17 pages.
Office Action dated May 10, 2016; U.S. Appl. No. 14/199,717, filed Mar. 6, 2014; 11 pages.
Final Office Action dated Aug. 25, 2016; U.S. Appl. No. 14/199,717, filed Mar. 6, 2014; 10 pages.
Advisory Action dated Nov. 18, 2016; U.S. Appl. No. 14/199,717, filed Mar. 6, 2014; 4 pages.
Office Action dated Jan. 11, 2017; U.S. Appl. No. 14/199,717, filed Mar. 6, 2014; 10 pages.
Final Office Action dated May 19, 2017; U.S. Appl. No. 14/199,717, filed Mar. 6, 2014; 18 pages.
Advisory Action dated Jul. 28, 2017; U.S. Appl. No. 14/199,717, filed Mar. 6, 2014; 6 pages.
Office Action dated Aug. 28, 2017; U.S. Appl. No. 14/199,717, filed Mar. 6, 2014; 11 pages.
Final Office Action dated Mar. 30, 2018; U.S. Appl. No. 14/199,717, filed Mar. 6, 2014; 13 pages.
Advisory Action dated Jun. 15, 2018; U.S. Appl. No. 14/199,717, filed Mar. 6, 2014; 9 pages.
Office Action dated Aug. 7, 2018; U.S. Appl. No. 14/199,717, filed Mar. 6, 2014; 17 pages.
Final Office Action dated Jan. 18, 2019; U.S. Appl. No. 14/199,717, filed Mar. 6, 2014; 18 pages.
Advisory Action dated Mar. 29, 2019; U.S. Appl. No. 14/199,717, filed Mar. 6, 2014; 6 pages.
Notice of Allowance dated Jun. 26, 2019; U.S. Appl. No. 14/199,717, filed Mar. 6, 2014; 18 pages.
PCT International Search Report; Application No. PCT/CA2004/001923; dated Mar. 23, 2005; 3 pages.
PCT Written Opinion of the International Searching Authority; Application No. PCT/CA2004/001923; dated Mar. 23, 2005; 4 pages.
PCT International Preliminary Report on Patenability (Chapter II); Application No. PCT/CA2004/001923; dated Aug. 31, 2006; 9 pages.
Canadian Office Action; Application No. 2,565,398; dated Feb. 8, 2010; 2 pages.
European Supplementary Search Report; Application No. 04797177.5; dated Sep. 24, 2007; 3 pages.
European Examination Report; Application No. 04797177.5; dated Mar. 20, 2008; 5 pages.
European Summons to Attend Oral Proceedings; Application No. 04797177.5; dated Mar. 10, 2010; 8 pages.
European Decision to Refuse; Application No. 04797177.5; dated Oct. 20, 2010; 6 pages.
European Extended Search Report; Application No. 10178511.1; dated Nov. 5, 2010; 6 pages.
European Examination Report; Application No. 10178511.1; dated Feb. 20, 2012; 5 pages.
European Summons to Attend Oral Proceedings; Application No. 10178511.1; dated Nov. 14, 2012; 7 pages.
European Summons to Attend Oral Proceedings; Application No. 10178511.1; dated Jan. 9, 2014; 15 pages.
European Decision to Refuse; Application No. 10178511.1; dated Jun. 20, 2014; 16 pages.

\* cited by examiner

USER INTERFACE FOR INTEGRATING APPLICATIONS ON A MOBILE COMMUNICATION DEVICE

CROSS-REFERENCE TO RELATED APPLICATION

This application is a continuation of U.S. patent application Ser. No. 14/199,717 filed Mar. 6, 2014, which is a continuation of U.S. patent application Ser. No. 12/772,853 filed May 3, 2010, which is a continuation of U.S. patent application Ser. No. 10/982,293, filed Nov. 5, 2004, which claims priority from and is related to the following prior application: "User Interface For Integrating A Calendar Application With An Instant Messaging Application," U.S. Provisional Application No. 60/567,563, filed May 3, 2004. These prior applications, including the entirety of the written description and drawing figures, are hereby incorporated into the present application by reference.

FIELD

The technology described in this patent document relates generally to the field of mobile communication devices. More particularly, this patent document describes user interfaces and methods for integrating various applications, such as a calendar, a contact list, an address book, and instant messaging in a mobile communication device.

BACKGROUND AND SUMMARY

Mobile communication devices (e.g., PDAs, cellular telephones, laptop computers, etc.) commonly include a number of different application programs, such as instant messaging applications, calendar applications, address book applications, electronic mail applications, and others. A user interface, in accordance with the teachings described herein, is provided for integrating applications on a mobile communication device. An instant messaging user interface may be included for displaying an instant messaging communication that includes an instant messaging contact. An instant messaging user interface menu may be included for displaying a list of commands, one or more of the commands being specific to the displayed instant messaging contact, and the list of commands including a command associated with a calendar application. The user interface may be operable to automatically launch the calendar application in response to a user selecting the command associated with the calendar application. A field in the calendar application may be automatically populated with the instant messaging contact.

DESCRIPTION

Figure 1:
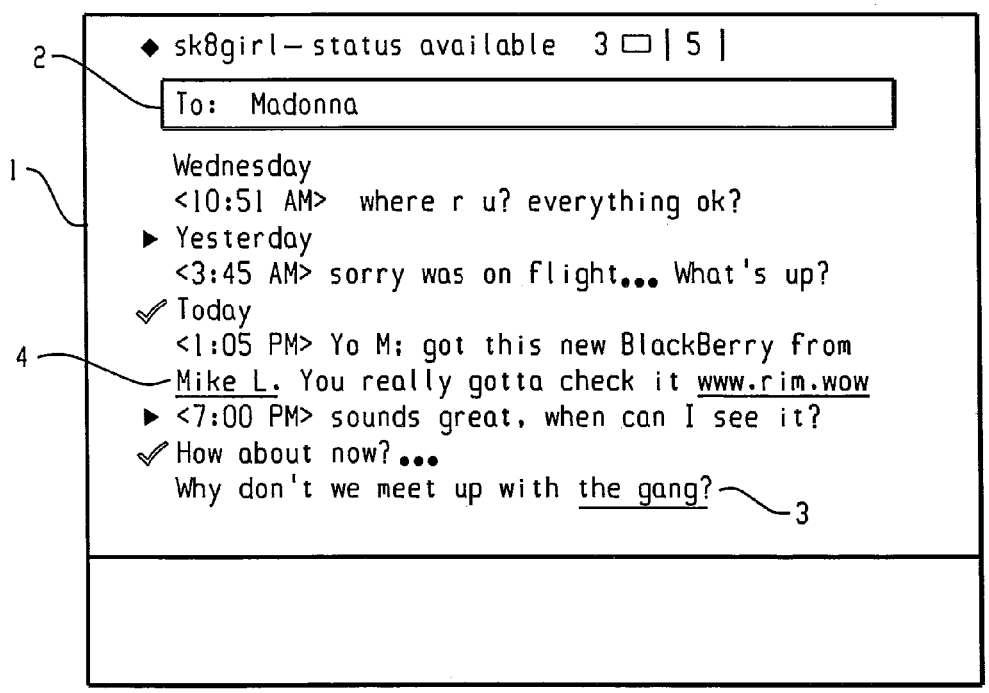
FIG. 1 illustrates an instant messaging communication displayed on an example instant messaging user interface.
Figure 6:
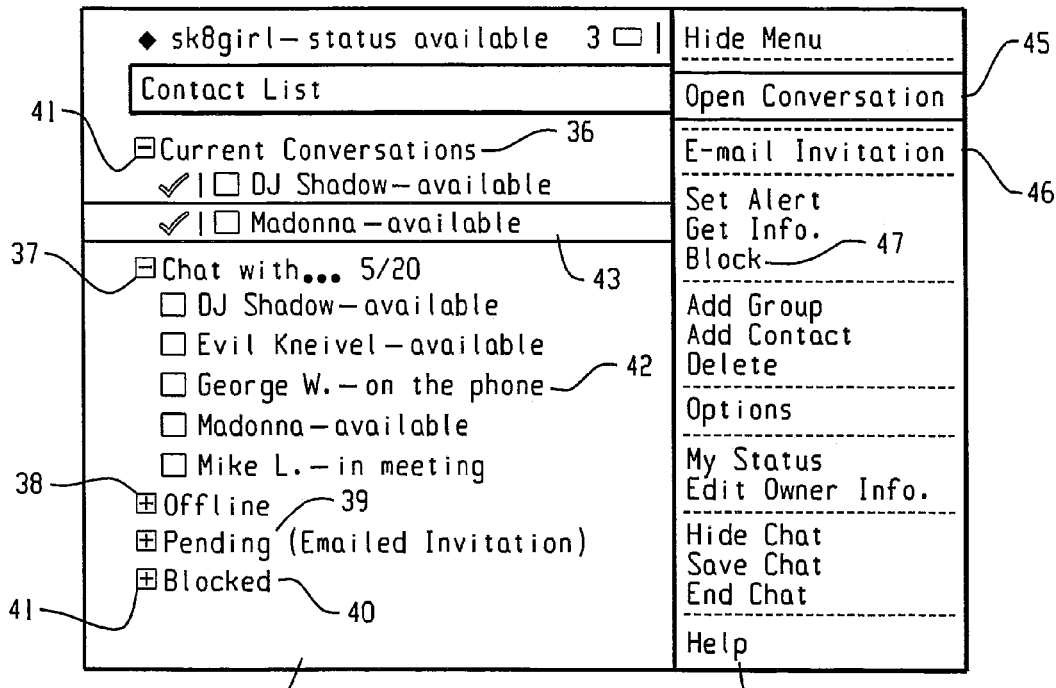
FIG. 6 illustrates an example contact list user interface and an example contact list user interface menu.

With reference to FIG. 1, an instant messaging communication 1 displayed on an example instant messaging user interface is illustrated. An instant messaging application having the illustrated interface may, for example, be launched by selecting a pre-determined key or option on a mobile communication device. For example, the instant messaging application may be launched by selecting an application icon associated with the instant messaging application, by pressing the "Q" key or some other designated key or combination of keys associated with the instant messaging application, by selecting a "Quick Messages" option from a menu on a main user interface screen, or by some other means. A contact may then be selected from within the instant messaging application user interface. For instance, in the illustrated example the contact "Madonna" may have been be selected from a contact list. An instant messaging session may then be initiated from the instant messaging user interface, for instance by selecting an "Open Conversation" option (FIG. 6).

The example communication illustrated in FIG. 1 includes a "To:" field 2 specifying the selected contact (e.g., "Madonna") and a message body 1 in which one or more communication messages with the selected contact are displayed. During the example instant messaging communication 1, a text message is received and displayed that includes reference to "the gang" 3, which may be, for example, a pre-defined group of contacts in an instant messaging contact list or address book. Similarly, another text message is input and displayed in the example communication 1 that includes reference to "Mike L." 4, which may be, for example, a single contact in the instant messaging contact list or address book. An example address book is described below with reference to FIG. 5, and an example instant messaging contact list is described below with reference to FIG. 6.

With reference again to FIG. 1, when the name of a contact or group of contacts from the instant messaging contact list or address book is displayed on the instant messaging user interface, the interface creates a selectable field 3, 4, such as a hypertext link, as illustrated in FIG. 1 by the underlined contacts "Mike L." 4 and "the gang" 3. Selecting the field 3, 4, for example by clicking or pressing a trackwheel, another input device, or by some other input means, may present a menu where you can choose any form of communication contact method already associated with the contact, i.e. initiate an instant messaging communication with the selected contact, initiate a phone conversation with the selected contact, access address book information for the selected contact, open a menu with options available for the selected contact, or perform other available functions specific to the selected contact.

Figure 2:
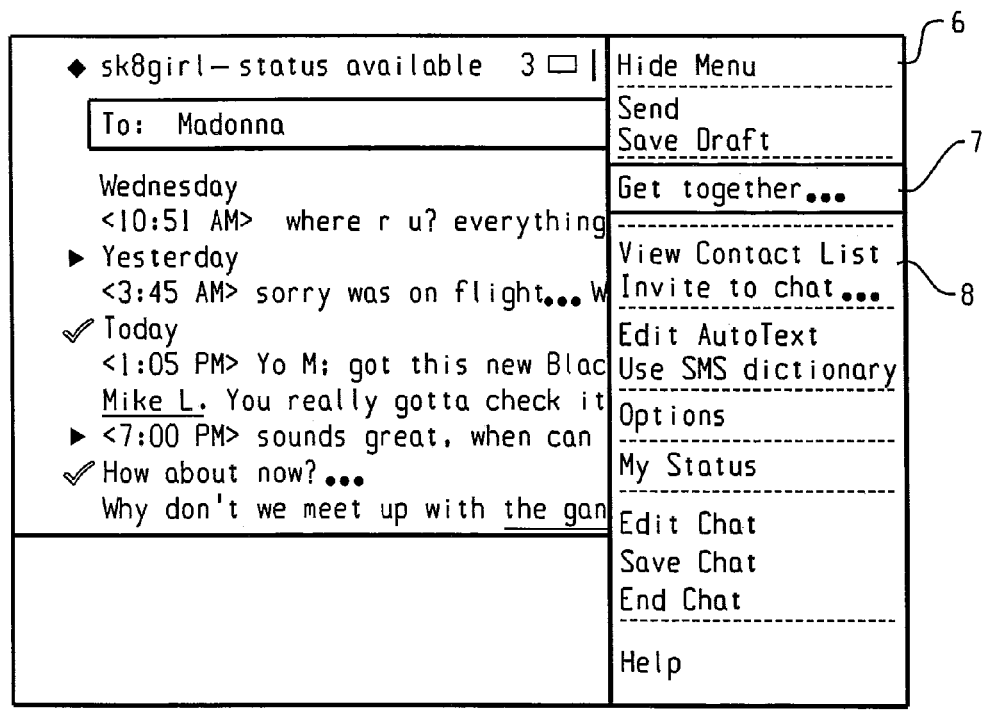
FIG. 2 illustrates an example instant messaging user interface menu displayed on an instant messaging user interface.

FIG. 2 illustrates an example instant messaging user interface menu 6 that may be accessed from within the instant messaging user interface of FIG. 1. For example, the menu 6 may be accessed by clicking or pressing a trackwheel, another input device, or by some other input means. The example instant messaging user interface menu 6 includes a field 7 to select a "Get Together . . ." option, a field 8 to select a "View Contact List" option, and fields for selecting other available options. The menu options 7, 8 may, for example, be executed by highlighting the option and clicking or pressing a trackwheel, another input device, or by some other input means.

Figure 3:
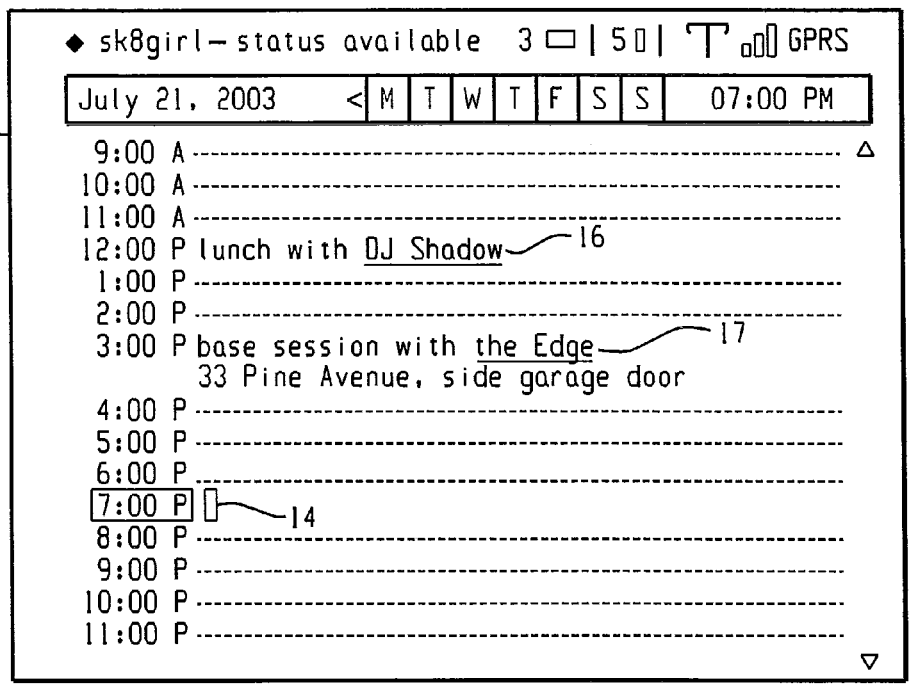
FIG. 3 illustrates an example calendar user interface.

Executing the "Get Together . . . " option 7 from within the instant messaging menu 6 may cause the mobile communication device to automatically launch a calendar application, as shown in FIG. 3. The example calendar user interface 10 illustrated in FIG. 3 includes a list of time slots for the selected date, with each time slot including a field for entering text. For example, the text field for the 12:00 P time slot illustrated in FIG. 3 has been populated with the text "lunch with D J Shadow." Similar to the instant messaging user interface, instant messaging contacts or groups entered into the calendar user interface 10 cause the interface 10 to display a selectable field 16, 17, such as a hypertext link. Selecting the field 16, 17 and clicking or pressing a trackwheel, another input device, or by some other input means from within the calendar application 10 may present a menu where you can choose any form of communication contact method already associated with the contact, i.e. initiate an instant messaging communication with the selected contact, initiate a phone conversation with the selected contact, access address book information for the selected contact, open a menu with options available for the selected contact, or perform other available functions specific to the selected contact.

In the example of FIG. 3, a calendar entry 14 is automatically selected for a proposed meeting at 7:00 P, Jul. 21, 2003, on a Friday. The time slot for the calendar entry (e.g. 7:00 P in the illustrated example) may be automatically selected based on the time of the current instant messaging communication. For example, the current instant messaging communication shown in FIG. 2 takes place at 7:00 PM, and therefore the calendar entry shown in FIG. 3 may be automatically selected at 7:00 P. The user may then select another date and/or time, if desired. Once a calendar entry is selected, the user may enter text via a keyboard or other textual input device.

Figure 4:
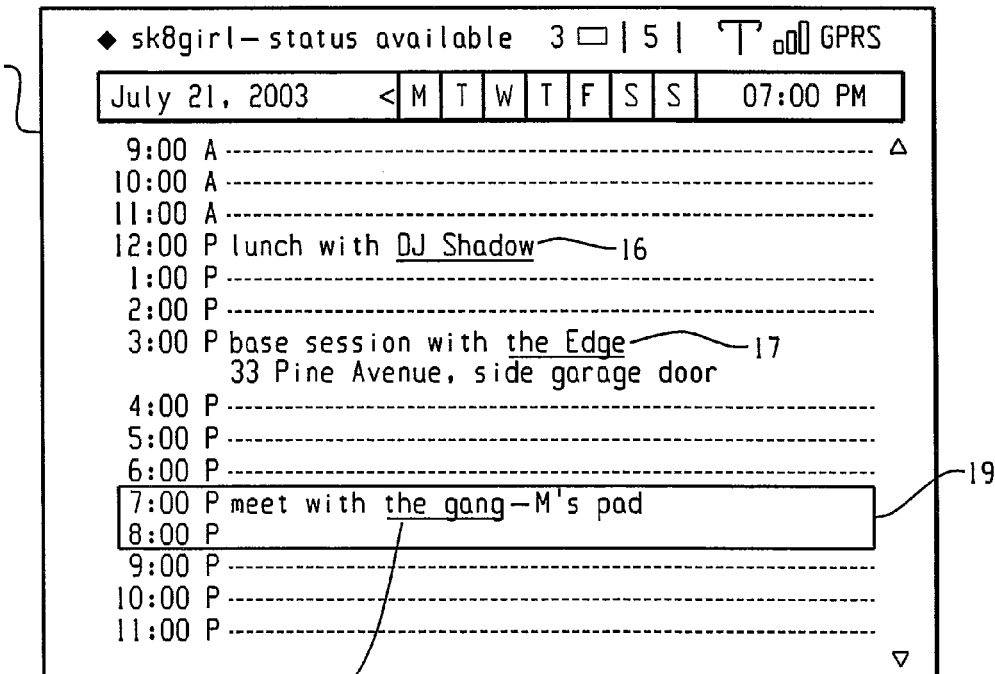
FIG. 4 illustrates an example calendar entry field within an example calendar user interface.

FIG. 4 illustrates an example text entry field 19 for a calendar user interface 10. When accessed through the instant messaging user interface, the calendar entry field 19 may be automatically populated based on the context in which the "Get Together . . . " option 7 was initiated. In the illustrated example, if the instant messaging menu 6 shown in FIG. 2 was initiated while the field "the gang" 3 was highlighted or otherwise identified (e.g., by positioning a cursor over the field), then the "Get Together . . . " option 7 may operate to automatically populate the calendar entry field 19 shown in FIG. 4 with an entry including the instant messaging field "the gang" 21 after the user selects a time slot. For instance, in the example of FIG. 4, the "Get Together . . . " option 7 may automatically populate the calendar entry field 19 with the text "meet with the gang" or with some other text referencing a scheduled meeting with the instant messaging contact "the gang."

Figure 5:
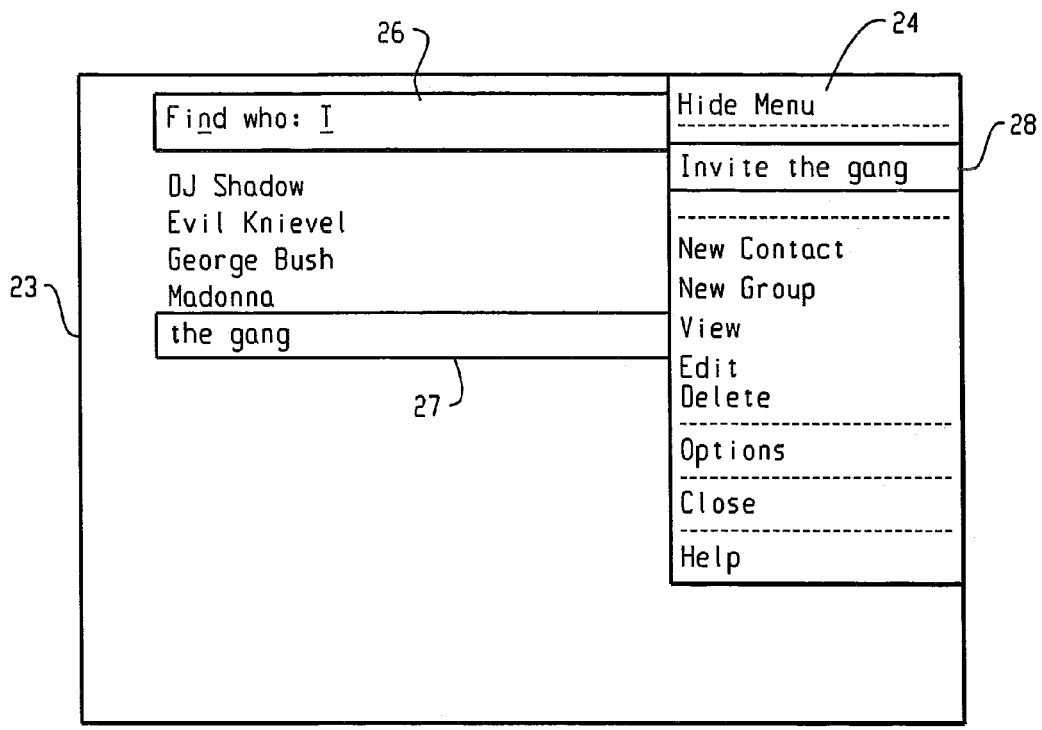
FIG. 5 illustrates an example address book user interface and an example address book user interface menu.

FIG. 5 illustrates an example address book user interface 23. As described above, an address book application may be automatically launched from a selectable field, such as a hypertext link, within the instant messaging application, the address book application or some other application on the mobile communication device. For example, the address book application may be automatically launched by selecting the field "the gang" illustrated in FIG. 1 and FIG. 4 and clicking or pressing a trackwheel, another input device, or by some other input means.

The example address book user interface 23 of FIG. 5 includes a list of instant messaging contacts and/or other contacts, and a search engine 26 operable to receive text from a keyboard or other textual input device and search the list for a particular contact. Also illustrated is an example address book user interface menu 24. The address book menu 24 may, for example, be accessed from within the address book application, or may be accessed from other applications. For example, the address book menu 24 or a menu having some or all of the address book menu options may be accessed from the calendar user interface by launching a menu function while a selectable field (e.g., "the gang") is highlighted or otherwise selected. For instance, in the example of FIG. 4, the address book menu 24 or a menu having some or all of the address book menu options may be accessed by highlighting the field "the gang" 21 and launching a menu function (e.g., by clicking or pressing a trackwheel, another input device, or by some other input means.)

When the address book menu 24 is accessed while a contact is selected or otherwise identified from the list, menu options specific to the identified contact may be included. For instance, in the illustrated example the menu 24 has been accessed while the instant messaging contact "the gang" is highlighted, causing the option "Invite the gang" to be displayed in the menu 24. Upon selecting the "Invite the gang" option 28 from the menu 24, a message may be transmitted to each of the contacts listed within the contact group "the gang" 27, inviting the contacts to attend a scheduled meeting. If the contacts accept the invitation, then a calendar entry may be automatically populated within their respective calendar applications, similar to the calendar entry 19 illustrated in FIG. 4.

Figure 7:
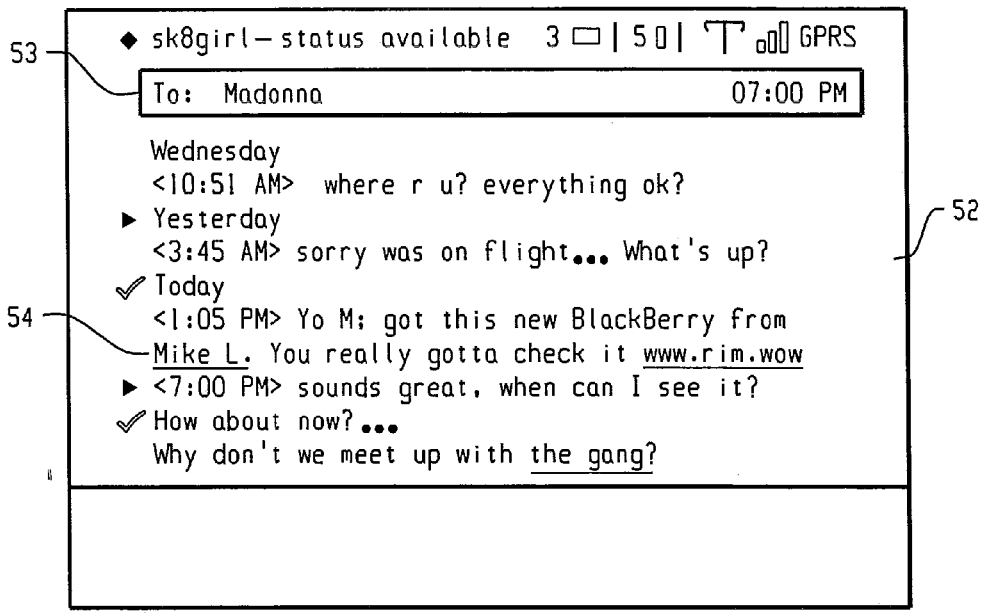
FIG. 7 illustrates an example instant messaging communication displayed on an instant messaging user interface.
Figure 8:
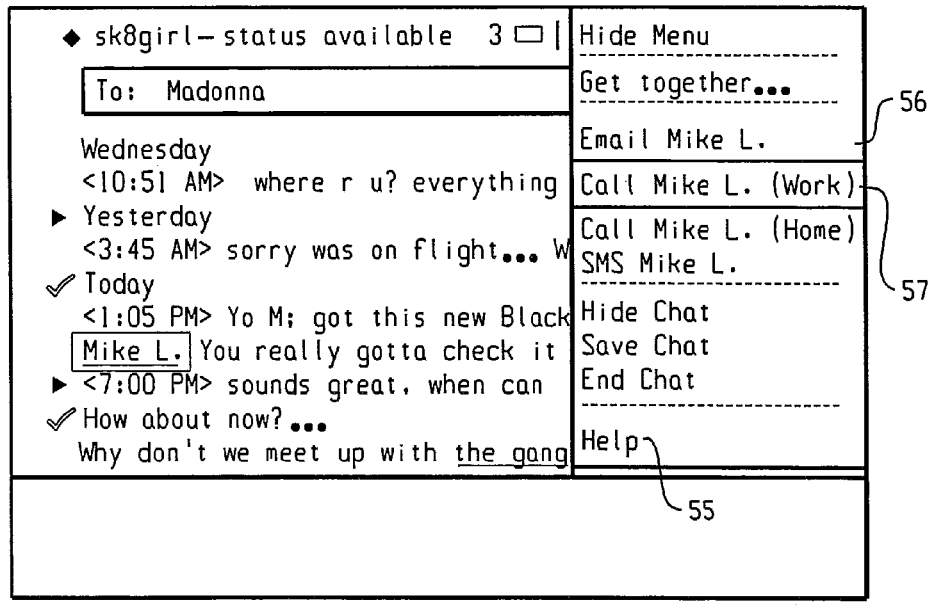
FIG. 8 illustrates an example instant messaging user interface menu specific to a selected contact displayed on an instant messaging user interface.

FIGS. 6-8 illustrate an example user interface and method for monitoring the availability status of a contact. Following is an example scenario, as illustrated in FIGS. 6-8, in which availability status information is accessed and utilized from an instant messaging user interface.

A mobile communication device user would like to set up a meeting between a first contact (e.g., Madonna) and a second contact (e.g., Mike L.) The user accesses status information regarding the second contact (e.g. Mike L.) to determine that he is currently in a meeting, but knows that he will generally accept telephone calls in this status if he can from this user if he thinks it is important. The user then uses the mobile communication device to initiate an instant messaging conversation with the first contact (e.g., Madonna) to determine her availability for the proposed meeting. Upon confirming the first contact's availability, the user then uses the mobile communication device to telephone the second contact (e.g., Mike L.) to set up the meeting.

FIG. 6 illustrates an example contact list user interface 35 for viewing availability information for one or more instant messaging contacts. The contact list 35 may be accessed, for example, by selecting the "View Contact List" option 8 from the example instant messaging user interface menu 6 shown in FIG. 2. The example contact list user interface 35 includes a list of contacts 36 that are currently in an instant message communication with the user, and a list of all the user's instant messaging contacts 37 that currently have the ability to communicate with the user. Also included are a list of the contacts 38 that are currently offline, a list of the pending contacts 39 that have been sent an email invitation, and a list of contacts that have been blocked by the user 40. Each list may be displayed or hidden, for example, by selecting a field 41, such as a graphical icon or other UI component, from the user interface 35.

The example contact list user interface 35 also displays an availability status for each of the listed contacts. The availability status indicates whether the instant messaging contact is currently available for an instant messaging communication, and may also indicate additional information regarding the contacts availability status. For example, FIG. 6 shows that "George W." is "on the phone" 42, and therefore unavailable to chat in an instant message conversation with the user at this particular moment. The status of the contact "Madonna" 43, however, is listed as "available." This alerts the user that "Madonna" 43 is currently present and available to chat if the user decides to initiate or resume an instant messaging communication.

Also illustrated in FIG. 6 is an example contact list user interface menu 44 for selecting options available for a selected one or more of the displayed contacts. The contact list menu 44 may, for example, be accessed by launching a menu function while one of the listed contacts is highlighted or otherwise selected. For instance, in the example of FIG. 6, a user has accessed the contact list user interface menu 44 by selecting the contact "Madonna" 43 and activating the menu function (e.g., by clicking or pressing a trackwheel, another input device, or by some other input means.) The menu 44 may include menu options that are specific to the selected contact (e.g., Madonna). For example, the example menu 44 includes an "Open Conversation" option 45 to initiate an instant messaging communication with the selected contact (e.g., Madonna), an "Email Invitation" option 46 to send an invitation to a contact in the user's contact list to accept and download the instant messaging application, a "Block" option 47 to block communications with a contact, and other available functions specific to the selected contact.

FIG. 7 illustrates an example instant messaging user interface 52 that may be accessed, for example, by selecting the "Open Conversation" option 45 from the example contact list user interface menu 44 shown in FIG. 6. In this example, the user is communicating with the contact "Madonna" 53 and has entered text that includes the name of another contact, "Mike L." 54. The instant messaging user interface 52 recognizes the contact name (Mike L.) from the contact list or the address book in the entered or received text and generates a link, which may be selected, for example, by highlighting the contact name and clicking or pressing a trackwheel, another input device, or by some other input means. Selecting the link opens a user interface menu 55 specific to the contact, as illustrated in FIG. 8. The user interface menu 55 includes menu options specific to the contact, including options which operate to launch specific communication applications and populate fields within the applications with the appropriate contact information. For example, if a user selects the menu option "Email Mike L." 56, then the mobile communication device may launch an electronic messaging application and automatically populate the recipient field of an outgoing electronic message (i.e., the "to" field) with the email address for the contact (Mike L.) from the address book. Similarly, if a user selects the menu option "Call Mike L. (Work)" 57, then the mobile communication device may initiate a phone call using the work phone number stored for the contact (Mike L.) from the address book.

Figure 9:
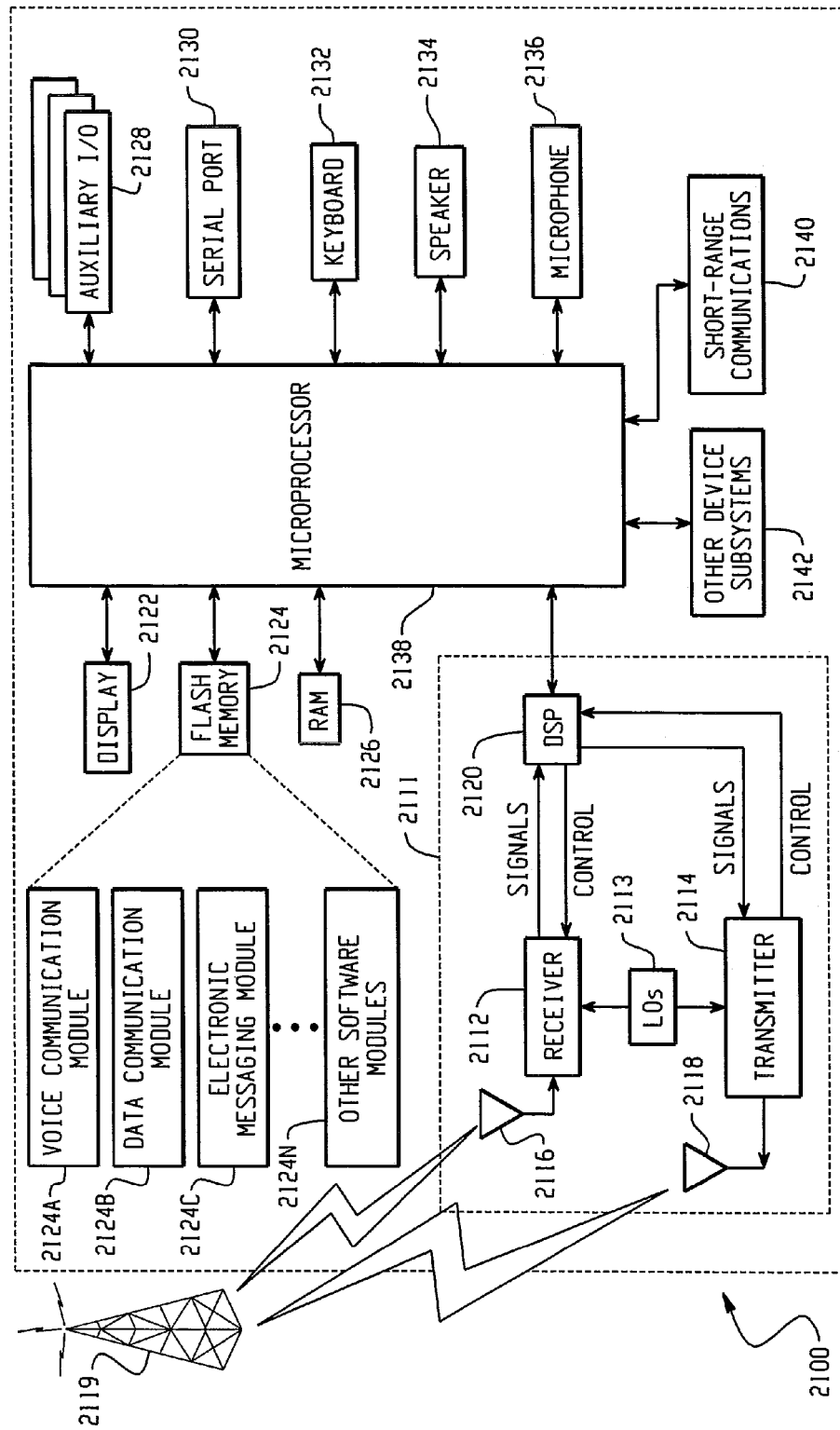
FIG. 9 is a block diagram illustrating an example mobile communication device.

FIG. 9 is a block diagram illustrating an example mobile communication device 2100 that may include the example user interfaces described herein. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a display 2122, a serial port 2130, keyboard 2132, a speaker 2134, a microphone 2136, and one or more auxiliary input/output devices 2128.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

The invention claimed is:

1. A method of operating a mobile device, the method comprising:
   receiving an instant messaging communication at the mobile device, the instant messaging communication comprising text, and further comprising a group indicator corresponding to a predefined group of contacts, the text and group indicator being usable by an instant messaging application;
   displaying the text and group indicator within a conversation user interface of the instant messaging application, the group indicator being displayed as a selectable group indicator;
   detecting a first user input at the mobile device to select the selectable group indicator;
   in response to detecting the first user input, displaying a menu having a list of options, the list of options including an option associated with a calendar application;
   detecting a second user input at the mobile device to select the option associated with the calendar application;
   in response to detecting the second user input, automatically launching the calendar application of the mobile device; and
   automatically displaying, in a respective field of a user interface of the calendar application, a meeting event relating to the predefined group of contacts to which the selectable group indicator corresponds.

2. The method of claim 1, wherein displaying the group indicator comprises highlighting the group indicator in the conversation user interface.

3. The method of claim 2, wherein highlighting the group indicator comprises underlining the group indicator in the conversation user interface.

4. The method of claim 1, wherein the instant messaging communication comprises an invitation to a meeting, and
   wherein the method further comprises populating a calendar entry based on the invitation to the meeting.

5. The method of claim 1, wherein the instant messaging communication is a message transmitted to the group of contacts.

6. The method of claim 1, wherein the instant messaging communication comprises an invitation to attend a meeting.

7. A mobile device comprising:
   a processor;
   a display; and
   memory, wherein the memory comprises computer executable instructions that when executed by the processor cause the mobile device to perform operations comprising:
      receiving an instant messaging communication, the instant messaging communication comprising text, and further comprising a group indicator corresponding to a predefined group of contacts, the text and group indicator being usable by an instant messaging application;
      displaying the text and group indicator within a conversation user interface of the instant messaging application, the group indicator being displayed as a selectable group indicator;
      detecting a first user input to select the selectable group indicator;
      in response to detecting the first user input, displaying a menu having a list of options, the list of options including an option associated with a calendar application;
      detecting a second user input to select the option associated with the calendar application;
      in response to detecting the second user input, automatically launching the calendar application of the mobile device; and
      automatically displaying, in a respective field of a user interface of the calendar application, a meeting event relating to the predefined group of contacts to which the selectable group indicator corresponds.

8. The mobile device of claim 7, wherein displaying the group indicator comprises highlighting the group indicator in the conversation user interface.

9. The mobile device of claim 8, wherein highlighting the group indicator comprises underlining the group indicator in the conversation user interface.

10. The mobile device of claim 7, wherein the instant messaging communication comprises an invitation to a meeting, and
    wherein the operations further comprise populating a calendar entry based on the invitation to the meeting.

11. The mobile device of claim 7, wherein the instant messaging communication is a message transmitted to the group of contacts.

12. A computer program product comprising a non-transitory computer readable storage medium having computer readable program code embodied therewith, the computer readable program code, when executed by a mobile device, configures the mobile device to perform;
   receiving an instant messaging communication at the mobile device, the instant messaging communication comprising text, and further comprising a group indicator corresponding to a predefined group of contacts, the text and group indicator being usable by an instant messaging application;
   displaying the text and group indicator within a conversation user interface of the instant messaging application, the group indicator being displayed as a selectable group indicator;
   detecting a first user input at the mobile device to select the selectable group indicator;
   in response to detecting the first user input, displaying a menu having a list of options, the list of options including an option associated with a calendar application;
   detecting a second user input at the mobile device to select the option associated with the calendar application;
   in response to detecting the second user input, automatically launching the calendar application of the mobile device; and
   automatically displaying, in a respective field of a user interface of the calendar application, a meeting event relating to the predefined group of contacts to which the selectable group indicator corresponds.

13. The computer program product of claim 12, wherein displaying the group indicator comprises highlighting the group indicator in the conversation user interface.

14. The computer program product of claim 13, wherein highlighting the group indicator comprises underlining the group indicator in the conversation user interface.

15. The computer product of claim 12, wherein the instant messaging communication comprises an invitation to a meeting, and
   wherein the computer readable program code further configures the mobile device to populate populating a calendar entry based on the invitation to the meeting.

16. The computer program product of claim 12, wherein the instant messaging communication is a message transmitted to the group of contacts.

17. The computer program product of claim 12, wherein the instant messaging communication comprises an invitation to attend a meeting.

* * * * *